United States Patent [19]

Kato et al.

[11] Patent Number: 4,832,883

[45] Date of Patent: May 23, 1989

[54] METHOD AND APPARATUS FOR CONTROLLING SCREW POSITIONS IN INJECTION MOLDING MACHINE

[75] Inventors: Masashi Kato; Akira Yokota, both of Hiroshima, Japan

[73] Assignee: The Japan Steel Works, Ltd., Tokyo, Japan

[21] Appl. No.: 895,636

[22] Filed: Aug. 12, 1986

[30] Foreign Application Priority Data

Dec. 17, 1985 [JP] Japan .............................. 60-282066
Jun. 11, 1986 [JP] Japan .............................. 61-133852

[51] Int. Cl.⁴ ...................... B29C 45/03; B29C 45/76
[52] U.S. Cl. .................................. 264/40.1; 425/135
[58] Field of Search ............... 264/40.1, 40.5, 40.7, 264/328.1; 425/149, 145, 135

[56] References Cited

U.S. PATENT DOCUMENTS 3,859,400  1/1975  Ma .................................. 264/40.5
3,920,367 11/1975  Ma et al. ........................... 425/149
4,066,725  1/1978  Boettner .......................... 264/40.5

FOREIGN PATENT DOCUMENTS 2019608 10/1978  United Kingdom ............... 264/40.1

Primary Examiner—Jan H. Silbaugh
Assistant Examiner—Mary Lynn Fertig
Attorney, Agent, or Firm—Sughrue, Mion, Zinn, Macpeak & Seas

[57] ABSTRACT

A method for controlling an injection molding machine involving the steps of: detecting, by a screw position detector, a position of a screw of the injection molding machine immediately before the start of injection, to produce a detecting signal; comparing the detecting value with a predetermined value for a plasticizing-/measurement position set in a metering position setter, to calculate any deviation therebetween; and adding-/substracting the deviation to or from predetermined values representative of switching-over positions set in switching-over position setters, thereby keeping constant an actual screw stroke from the plasticizing/measurement position to the switching-over position for every shot of the injection molding machine.

6 Claims, 5 Drawing Sheets

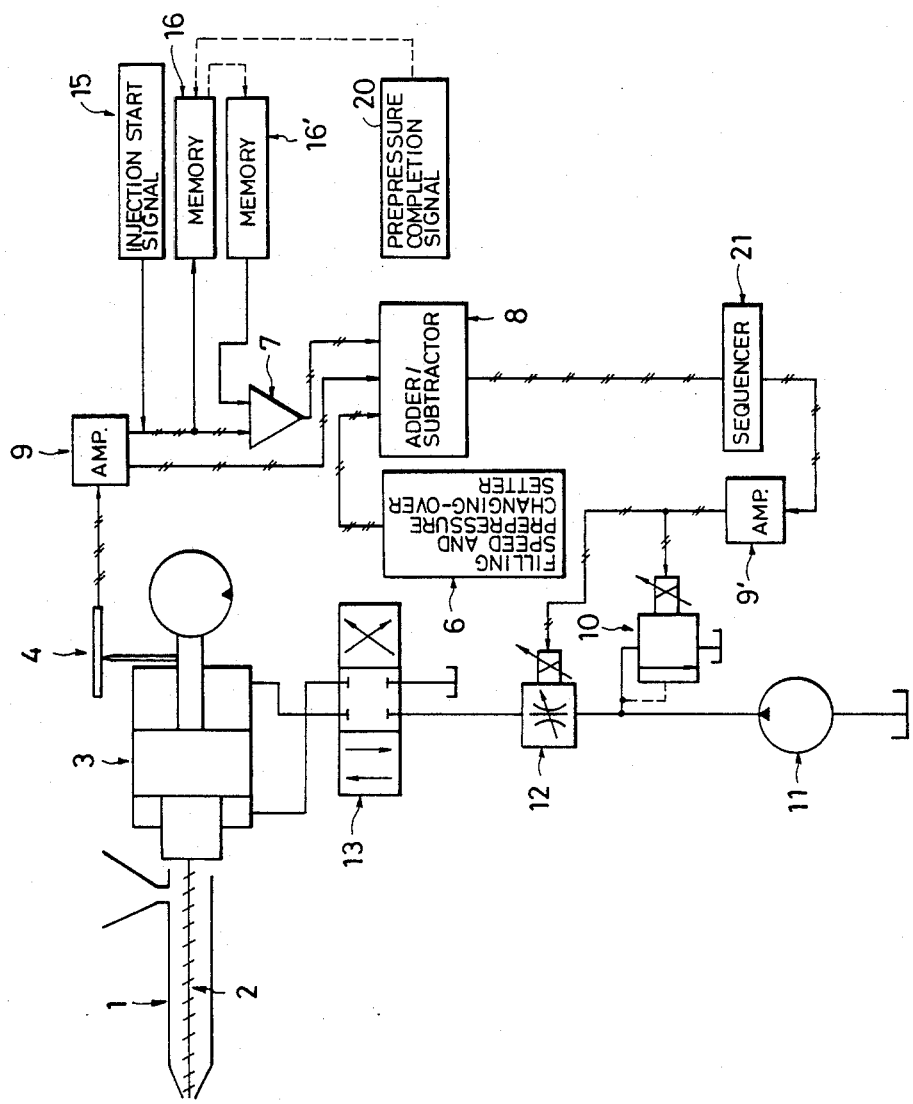

METHOD AND APPARATUS FOR CONTROLLING SCREW POSITIONS IN INJECTION MOLDING MACHINE

BACKGROUND OF THE INVENTION

1. Field of the Invention

The present invention relates to a switching-over control method and apparatus for controlling injection pressure, holding pressure or the like in an injection molding machine.

2. Description of the Prior Art

In a conventional technique, a control for switching over filling pressure and holding pressure of a molten resin within an injection molding machine is conducted by setting positions of a screw relative to a cylinder in advance and comparing the set positional values with values detected by screw position sensors. On the other hand, a starting position where the screw is operative for resin supply is determined by the screw stop position upon completion of plasticizing action or measurement operation. For that purpose the set value of the measurement position setter and the positional signal of the position detector for the screw are compared with each other by a comparator, so that when both the values are identical with each other, an ending signal is applied to a pressure control valve, a flow regulating valve, and- /or directional regulating valves to thereby stop the movement of the screw. According to a conventional method, a signal representative of completion of the plasticizing action and measurement operation is generated at a position Sm in FIG. 1.

However, the above-described conventional control manner suffers from the following disadvantages. Namely, although the screw should be stopped exactly at the time of preparation of the signals representative of the completion of the plasticizing action and measurement operation, the screws will be rotated through a small angle due to the inertia moment thereof. It is very difficult to keep constant such a rotation due to instability of mechanical loss or other factors. Furthermore, the pressure distribution of the molten resin in the cylinder is shown in FIG. 1. Assuming the pressure at the screw tip end is expressed by P1 and the pressure on the screw flight side is expressed by P2, the relationship, P1>P2, is established during screw rotation and after the completion of the measurement, so that the molten resin will flow to the left and will gradually move to meet the requirement, P1=P1, and stop. During a period from P1>P2 to P1=P2, the screw will be moved by a distance (Sm'=Sm), by the reaction of the molten resin as shown in FIG. 1 to increase the screw stroke. Namely, as shown in FIG. 1, the total increment of resin amounts corresponding to the inertia rotation of the screw and the resin reaction is expressed by $d$. As a result, as shown in FIG. 1, the deviation $d$ is added to the stroke from a predetermined metering position Sm to the filling pressure and/or speed change-over position Si, and the strokes to the holding pressure changeover position Sh (Sm-Si, Sm-Sh), respectively. Namely, since the amount of resin to be filled in the mold cavity is changed in accordance with the deviation $d$, there is a problem in obtaining a precise product.

SUMMARY OF THE INVENTION

According, an object of the present invention is to overcome the drawbacks inherent in the prior art system.

According to the present invention, there is provided a method for controlling an injection molding machine comprising the steps of: detecting, by a screw position detector, a position of a screw of said injection molding machine immediately before a start of injection, comparing said detecting signal with a predetermined value for a plasticizing/measurement position set in a measurement position setter, to calculate a deviation therebetween; and adding/subtracting said deviation to or from predetermined values representative of switching-over positions set in switching-over position setters, to thereby keep constant an actual screw stroke form said plasticizing/measurement position to the switching-over position in every shot of said injection molding machine.

According to another aspect of the invention, method for controlling an injection molding machine comprises the steps of: detecting a position of a screw by a screw position detector; setting injection speed and/or pressure change-over positions in advance; setting a rearmost position of said screw, detecting a deviation between a value representative of said rearmost position and a value representative of a position immediately before a start of injection, by said screw position detector; adding or subtracting the deviation to respective values representative of injection speed and/or pressure change-over positions; storing results of calculation from the step of adding or subtracting and controlling the injection molding operation in accordance with the results.

According to still another aspect of the invention, a method for controlling an injection molding machine comprises the steps of: detecting, by a screw position detector, a position of a screw of said injection molding machine immediatly before a start of injection; calculating the deviation between said position detected by said screw position detector and a value outputted from a memory that stores a screw position of a former shot immediately before a start of injection; and adding/subtracting said deviation to or from predetermined values representative of switching-over positions set in switching-over position setters, thereby performing a switching over operation when a value corrected by said deviation is identical with the detected value from said screw position detector.

Also, according to the present invention, three types of apparatus are provided for carrying out the foregoing methods.

BRIEF DESCRIPTION OF THE DRAWINGS

In the accompanying drawings:

FIG. 6 is a block diagram showing a third embodiment of the present invention.

DETAILED DESCRIPTION OF THE PREFERRED EMBODIMENT

The present invention will now be described in detail with reference to the accompanying drawings.

Figure 1:
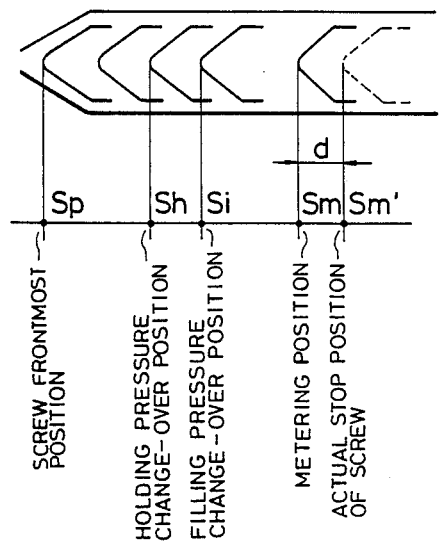
FIG. 1 shows a positional relationship between a screw and a cylinder in a prior art injection molding machine.
Figure 2:
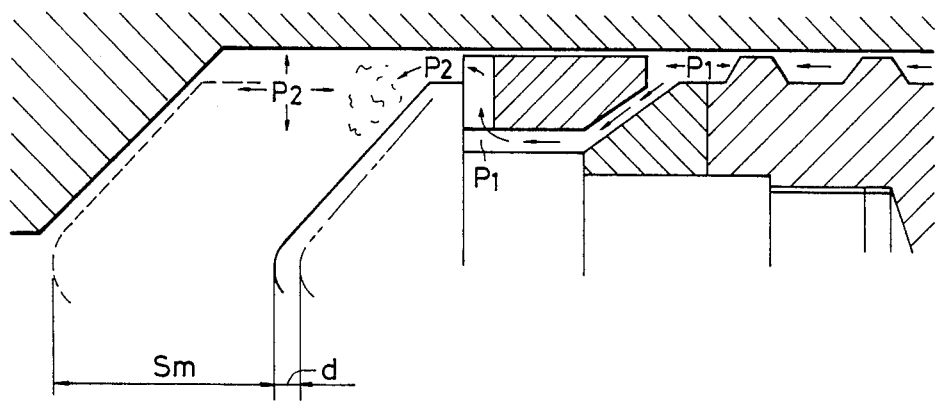
FIG. 2 illustrates the drawbacks inherent in the prior art injection molding machine.
Figure 3:
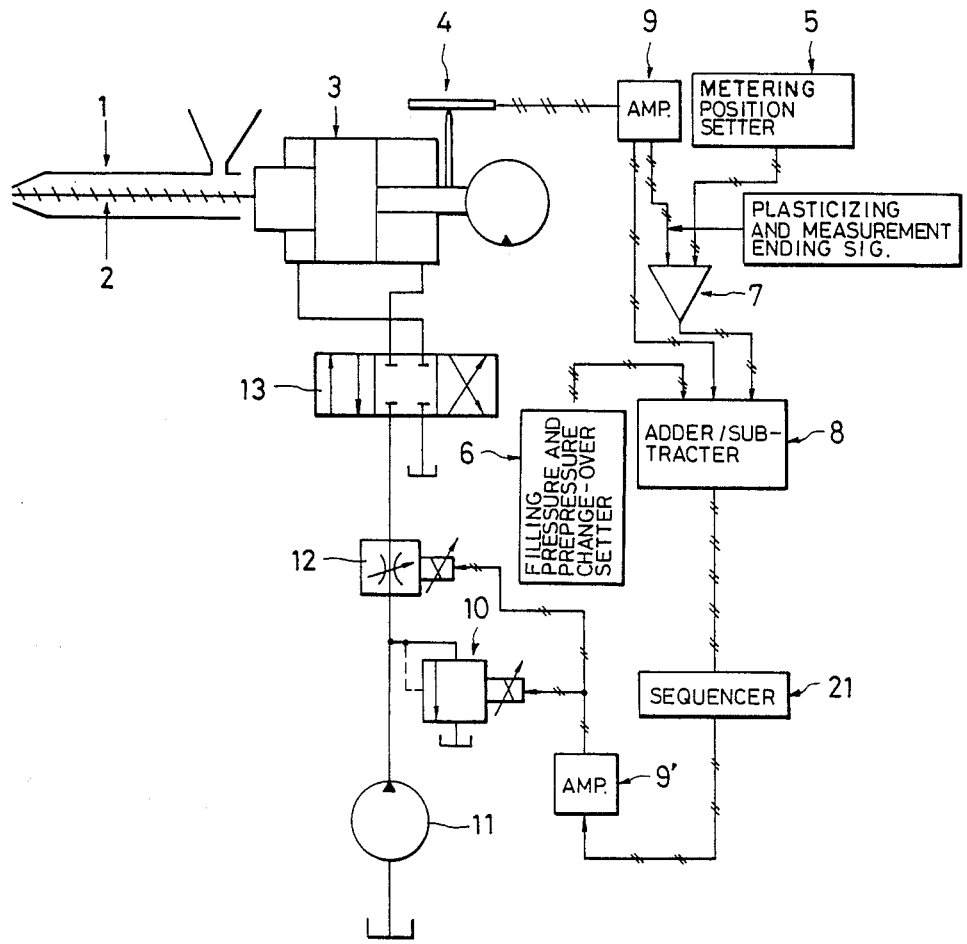
FIG. 3 is a block diagram showing a first embodiment of the present invention.
Figure 4:
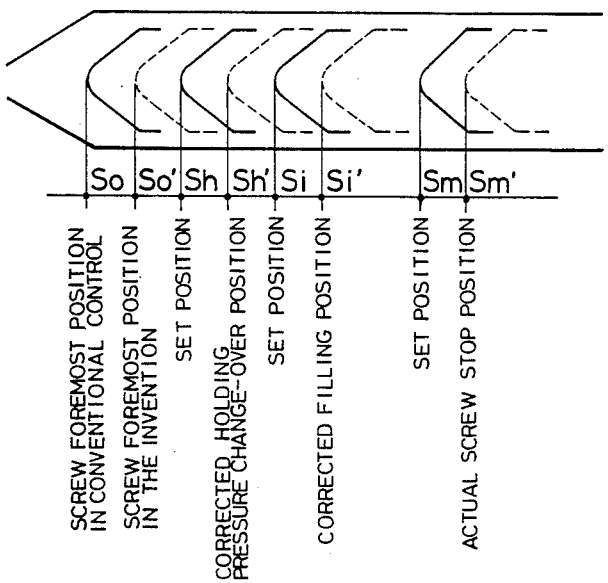
FIG. 4 shows a positional relationship between a screw and a cylinder in the system shown in FIG. 3.

FIG. 3 shows a block diagram in accordance with one embodiment of the invention. FIG. 4 shows the positional relationship of the screw stroke in accordance with the system shown in FIG. 3. As shown in FIG. 3, a screw 2 within a cylinder 1 is driven by a hydraulic pressure of an injection ram 3. The actual position of the screw 2 is detected by a position sensor 4 well known per se. A signal of the position sensor is applied through an amplifier 9 to a comparator 7. On the other hand, a predetermined set value representative of the screw position upon the completion of the plasticizing and measurement operation is applied form a suckback or metering position setter 5 to the comparator 7. Then, the detected value and the set value of the screw position are compared and calculated by the comparator 7, to thereby generate a deviation $d$ to an adder/subtractor device 8. In the device 8, the deviation $d$ is added to or subtracted from the switching-over position set values, for the filling pressure and/or speed and the holding pressure, outputted from a switching-over position setter 6, thus correcting the set values. Corrected set values are applied from the device 8 to a sequencer 21, and then a pressure control valve 10 and/or flow regulating valve 12 and driven through an amplifier 9′, thereby performing the switching-over control between the filling pressure and/or speed and the holding pressure. As is well known in the art, the control valve 10 is connected to a fluid passage between a pump 11 and a flow regulating valve 12, and the pressure is selectively applied to the ram cylinder to displace the ram 3.

FIG. 4 shows the switching-over position between the filling pressure and/or speed and holding pressure when corrected with the deviation $d$. Si is the filling pressure and/or speed change-over position and Si′ is the corrected position. Sh is the holding pressure change-over position set by the setter 6 and Sh′ is the corrected position. So is the screw foremost position in the conventional control and So′ is the position in the present invention. Namely, the relationships, $Si′=Si+d$, $Sh′=Sh+d$, and $So′=So+d$ are established. According to the present invention, each control signal generated from the device 8 is corrected with the deviation $d$. Therefore, for example, the relationship, $Sm-Sh=Sm′-Sh′$ is established, and hence the screw stroke may be kept exactly constant. The amount of the resin may be always kept exactly at the predetermined one.

According to the present invention, even if the molten resin amount at the plasticizing/measurement operation is changed, the amount of the resin injected into the mold cavity is kept constant between the respective switching-over positions between the filling pressure and/or speed and holding pressure, irrespective of the change of the molten resin amount. A stable product may be always obtained.

Figure 5:
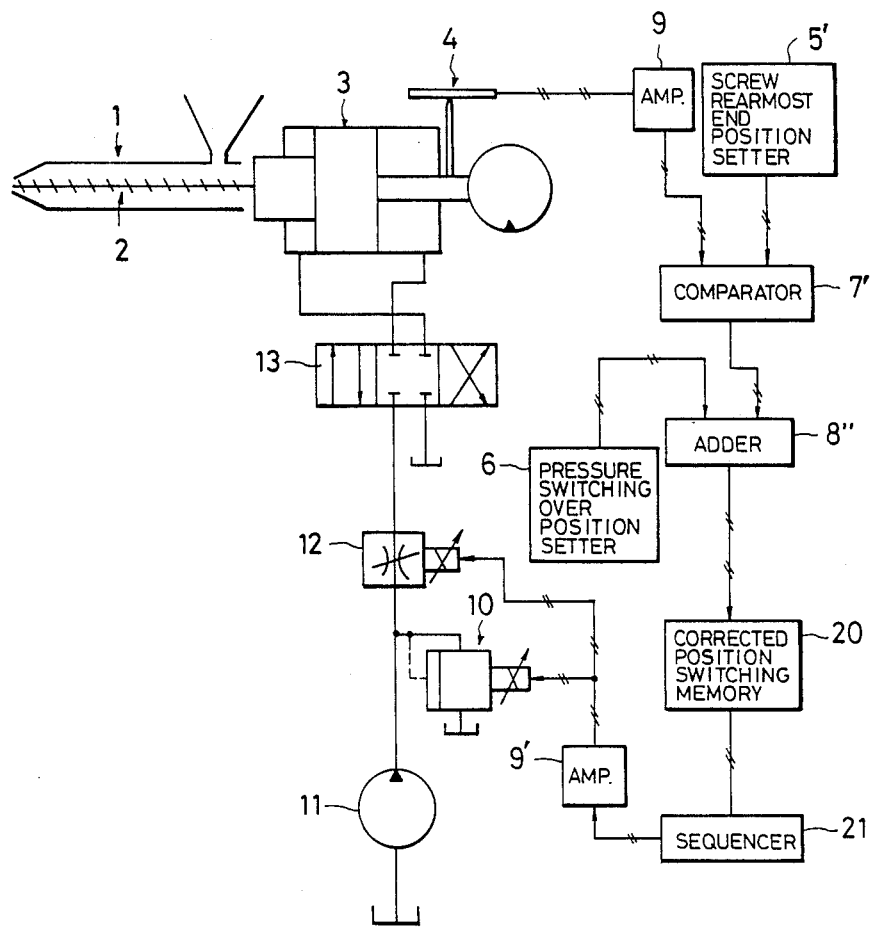
FIG. 5 is a block diagram showing a second embodiment of the present invention.

FIG. 5 shows another embodiment of the system according to the present invention. In FIG. 5, the same reference numerals are used to denote the like components shown in FIG. 3. In FIG. 5, numeral 5′ denotes a rearmost retracted position setter for setting a position where the measurement of the screw 2 is completed or a rearmost retracted position where a suckback operation or any other necessary operation is completed.

In order to keep constant the screw stroke, the following operations are carried out. A position of the screw 2 immediately before the injection action in the subsequent molding cycle is detected by a screw position detector 4. A deviation between the actual screw position value detected by the screw position detector 4 and the value set by a screw rearmost retracted position setter 5′ is calculated by a comparator 7′ which is a deviation calculator.

The obtained deviation is added or subtracted by adder 8″ to each value representing of the screw position set in advance by an injection process control position switching setter 6. Each added value is stored in a corrected injection process control position switching memory 20.

A designation of the screw stroke switching position for the actual injection speed is inputted into a sequencer 21 from the memory 20. Then, the sequencer 21 applies its opening signal to a pressure control valve 10 and/or flow regulating valve 12 through a driver amplifier 9′.

FIG. 6 shows another embodiment of the present invention in which the same reference characters are used to designate the like components or members in the foregoing embodiments. As shown in FIG. 6, a screw 2 in a cylinder 1 is driven through a working oil. An actual position of the screw is detected by a position detector 4. The signal from the detector 4 is inputted to a comparator through an amplifier when an injection start signal 15 is generated. Also, the start signal 15 is stored in a memory 16 as a signal representative of the screw position of the last shot immediately before the injection start. On the other hand, a signal representative of a screw position immediately before the injection start of a preshot stored in a memory 16′ is applied to the comparator 7. In the comparator 7, the detected value of the screw position, immediately before the injection start, of the present shot to be carried out is compared with the stored value of the screw position before the injection start of the preshot, to thereby apply its output to an adder/ subtracter 8, where the deviation $\Delta S$ is added to or subtracted from the respective filling pressure and/or speeds and the switching-over position setting values of the holding pressure changeover position setter 6, to thereby correct the set values. A control signal is fed through the sequencer 21 and through the amplifier 9′ to the pressure control valve 11 and/or the flow regulating valve 12, to thereby carry out filling speed and/or prepressure changeover control. The screw position immediately at the injection start of the last shot, stored in the memory 16 is transferred to the memory 16′ in accordance with the holding pressure completion signal 20.

Figure 7:
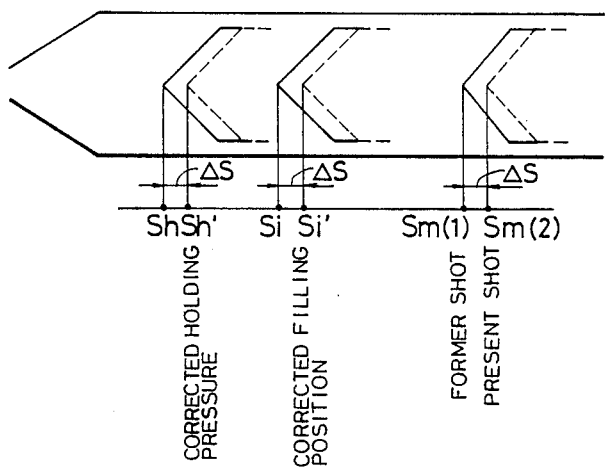
FIG. 7 shows a positional relationship between a screw and a cylinder in the system shown in FIG. 6.

FIG. 7 shows the positional relationship according to the system shown in FIG. 6. The corrected changeover positions for the filling pressure and/or speed and the holding pressure and designated by characters Si′ and Sh′ respectively. The following relationships are established, $Si′=Si+\Delta S$, and $Sh′=Sh+\Delta S$ where Si and Sh are the set values for the changeover positions for the filling pressure and/or the prepressure. Since the control signal outputted from the adder/subtractor 8 has been corrected with the deviation $\Delta S$, the relationship, $Sm(2)-Sh'-Sm(1)-Sh$, is established, to thereby keep constant the screw stroke in every shot, where $Sm(1)$ and $SM(2)$ represent the actual screw positions of the former shot and the present shot immediately before the injection start, respectively.

We claim:

1. A method for controlling an injection molding machine comprising the steps of:

forming a detecting signal, by a screw position detector, of a position of a screw of said injection molding machine immediately before the start of injection;

comparing said detecting signal with a predetermined value for a plasticizing/measurement position set in a measurement position setter, to calculate a deviation therebetween; and adding said deviation to or subtracting said deviation from predetermined values representative of switching-over positions set in switching-over position setters, thereby changing the set positions immediately before the start of the same injection shot and keeping constant the actual screw stroke from said plasticizing/measurement position to the switching-over positions for every shot of said injection molding machine.

2. A method for controlling an injection molding machine comprising the steps of:

detecting a position of a screw by a screw position detector;

setting injection speed and/or pressure change-over positions in advance;

setting a rearmost position of said screw;

detecting a deviation between a value representative of said rearmost position and a value representative of said position, immediately before a start of injection, by said screw position detector;

adding the deviation to or subtracting the deviation from respective values representative of injection speed and/or pressure change-over positions;

storing the results of the calculations from the step of adding or subtracting; and controlling the current injection molding operation in accordance with the stored results by changing the set positions immediately before the start of the same injection shot, whereby the deviation between the position of the screw measured immediately before the commencement of the injection and the screw rearmost retracted position when added to or subtracted from the predetermined injection switching position eliminates the positional deviation and keeps the actual screw stroke constant for every shot of the injection molding machine.

3. A method for controlling an injection molding machine comprising the steps of:

detecting, by a screw position detector, a position of a screw of said injection molding machine immediately before a start of injection;

calculating a deviation between said position detected by said screw position detector and a value outputted from a memory that stores said screw position of a former shot immediately before a start of injection; and adding the deviation to or subtracting the deviation from predetermined values representative of switching-over positions set in switching-over position setters, and thereafter performing an injection molding operation including switching over from injection speed and/or pressure to a holding pressure, whereby the deviation between the set value and the actual value relative to the screw position is utilized in the current injection molding shot to keep the actual screw stroke constant from shot to shot.

4. An injection molding machine comprising:

a screw;

a screw position detector for detecting a position of said screw;

injection speed and/or pressure change-over position setting means for setting injection speed and/or pressure change-over positions in advance;

means for setting a rearmost position of said screw;

means for detecting a deviation between a value representative of said rearmost position set by said rearmost position setting means and a value representative of a position, immediately before a start of injection, detected by said screw position detector;

an adder or subtractor for adding said deviation to or subtracting said deviation from respective values representative of injection speed and/or pressure change-over positions set in said injection speed change-over position setting means; and storing means for storing results of calculation of said adder or subtractor, and means for thereby controlling the current injection molding operation with signals stored in said storing means, thereby changing the set positions immediately before the start of the same injection shot, thereby keeping constant the actual screw stroke for every shot of said injection molding machine.

5. An injection molding machine comprising:

a screw;

a screw position detector for detecting a position of said screw immediately before a start of injection;

means for setting a plasticizing/measurement position;

means for comparing said position of said screw detected from said screw position detector with the plasticizing/measurement position set in said measurement position setting means;

a switching-over position setter for setting switching over positions of said screw; and an adder/subtractor for adding/subtracting said deviation to or from predetermined values representative of switching-over positions set in the switching-over position setter, to thereby keep constant an actual screw stroke from the plasticizing/measurement position to the switching positions in every shot of said injection molding machine.

6. An injection molding machine comprising:

a screw;

a screw position detector for detecting a position of said screw immediately before a start of injection;

a memory for storing a screw position of a former shot immediately before a start of injection;

calculating means for calculating the deviation between said position detected by said screw position detector and a value outputted from said memory;

a switching-over position setter for setting a plurality of switching-over positions for said screw; and an adder/subtractor for adding/subtracting said deviation to or from predetermined values representative of switchingover positions set in said switching-over position setter, thereby keeping constant an actual screw stroke in every shot of said injection molding machine.

* * * * *